(12) United States Patent  (10) Patent No.: US 9,357,086 B2
Kirihata  (45) Date of Patent: May 31, 2016

(54) COMMUNICATION APPARATUS AND METHOD OF CONTROLLING SAME, AND STORAGE MEDIUM

(75) Inventor: Daiji Kirihata, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 220 days.

(21) Appl. No.: 13/323,230

(22) Filed: Dec. 12, 2011

(65) Prior Publication Data

US 2012/0203920 A1  Aug. 9, 2012

(30) Foreign Application Priority Data

Feb. 9, 2011 (JP) .................................. 2011-026528

(51) Int. Cl.
*G06F 15/16* (2006.01)
*H04N 1/00* (2006.01)
*H04N 1/32* (2006.01)
*H04L 29/12* (2006.01)

(52) U.S. Cl.
CPC ....... *H04N 1/00217* (2013.01); *H04N 1/00244* (2013.01); *H04N 1/32117* (2013.01); *H04L 61/1594* (2013.01); *H04N 2201/3205* (2013.01); *H04N 2201/3208* (2013.01); *H04N 2201/3278* (2013.01)

(58) Field of Classification Search
USPC .................................. 709/230–237, 204–206
See application file for complete search history.

(56) References Cited

U.S. PATENT DOCUMENTS

| 7,561,292 | B2 | 7/2009 | Jung | 358/1.15 |
|---|---|---|---|---|
| 7,761,517 | B2 | 7/2010 | Tsuruoka et al. | 709/206 |
| 8,005,904 | B2 | 8/2011 | Yokoyama et al. | 709/206 |
| 2004/0130747 | A1* | 7/2004 | Ohishi et al. | 358/1.15 |
| 2006/0140386 | A1* | 6/2006 | Morganstein et al. | 379/224 |
| 2007/0106995 | A1* | 5/2007 | Osaka | 718/106 |
| 2007/0260807 | A1* | 11/2007 | Noda | 711/100 |
| 2008/0144120 | A1* | 6/2008 | Katahira | 358/401 |
| 2009/0216839 | A1* | 8/2009 | Yokoyama et al. | 709/206 |
| 2009/0300219 | A1* | 12/2009 | Yaussy et al. | 709/246 |
| 2010/0011006 | A1* | 1/2010 | Shirai | 707/10 |
| 2010/0042737 | A1* | 2/2010 | Fujimoto et al. | 709/230 |
| 2010/0184378 | A1* | 7/2010 | Wakefield | 455/41.2 |
| 2010/0274769 | A1* | 10/2010 | Hazlewood et al. | 707/679 |
| 2010/0306760 | A1* | 12/2010 | Mulligan et al. | 717/174 |
| 2011/0119716 | A1* | 5/2011 | Coleman, Sr. | 725/62 |
| 2012/0158658 | A1* | 6/2012 | Wilkerson | 707/638 |
| 2013/0022284 | A1* | 1/2013 | Zheng | 382/229 |

FOREIGN PATENT DOCUMENTS

| CN | 1358384 A | 7/2002 |
|---|---|---|
| CN | 1625166 A | 6/2005 |

(Continued)

*Primary Examiner* — Chris Parry
*Assistant Examiner* — Weiwei Stiltner
(74) *Attorney, Agent, or Firm* — Fitzpatrick, Cella, Harper & Scinto

(57) ABSTRACT

Disclosed are a communication apparatus having a server function for making a storage device, which stores files, accessible over a network, and a method of controlling this apparatus. The apparatus and method set the server function, register an address, which is for transmitting a file to the storage device, in an address book, transfer a file to the storage device in accordance with the address that has been registered in the address book, and changes the address, which has been registered in the address book, in accordance with a change in the setting of the server function.

8 Claims, 9 Drawing Sheets

(56) References Cited

FOREIGN PATENT DOCUMENTS

| CN | 1717668 A | 1/2006 |
| CN | 101213538 A | 7/2008 |
| JP | 2005-006177 A | 1/2005 |
| JP | 2005157612 A * | 6/2005 |
| JP | 2007-251245 A | 9/2007 |
| JP | 2007-266982 A | 10/2007 |
| JP | 08-252505 * | 10/2008 |
| JP | 2008-252505 A | 10/2008 |
| JP | 2010-278499 A | 12/2010 |

* cited by examiner

FIG. 4

FILE SERVER SETTING

DISCLOSURE SETTING: ON ~401
PROTOCOL: SMB ~402
USER NAME: user ~403
PASSWORD: ******** ~404

FILE TRANSFER SETTING

ADDRESS BOOK: ~501

502~ FILE SERVER OF THIS DEVICE | ADVANCED ~503
FILE SERVER_A | ADVANCED
MAIL ADDRESS_B | ADVANCED
FAX_C | ADVANCED

SELECT ~504

FIG. 6

FILE TRANSFER SETTING

ADDRESS BOOK:

| FILE SERVER_A | ADVANCED | — 601 |
| MAIL ADDRESS_B | ADVANCED |
| FAX_C | ADVANCED |

SELECT

FIG. 7

FILE SERVER OF THIS DEVICE

PROTOCOL: SMB

HOST NAME: ¥¥localhost

FOLDER PATH: ¥shara

USER NAME: user

PASSWORD: ********

OK

F I G. 10
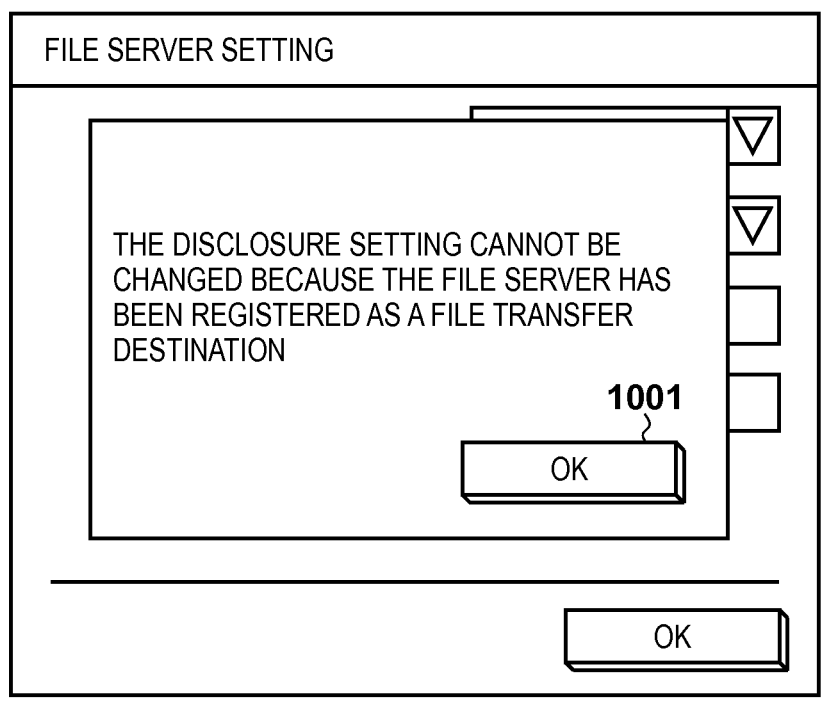

COMMUNICATION APPARATUS AND METHOD OF CONTROLLING SAME, AND STORAGE MEDIUM

BACKGROUND OF THE INVENTION

1. Field of the Invention

The present invention relates to a communication apparatus having a server function, a method of controlling this apparatus and a storage medium storing a program for this purpose.

2. Description of the Related Art

A conventional multifunction peripheral (MFP) has a transmitting function for transmitting, in the form of a facsimile transmission or e-mail in accordance with settings made by a user, files such as a file obtained by scanning in a document and converting image data of the document to an electronic signal, a file received from a personal computer or other multifunction peripheral over a network, or a file that has been stored in a storage device such as a hard disk. Such a multifunction peripheral usually has an address book in which a plurality addresses indicative of destination devices can be registered, and is capable of transmitting a file to a destination indicated by an address that has been registered in the address book. Japanese Patent Laid-Open No. 2008-252505 describes a technique in which, when a file is transmitted utilizing an address registered in an address book, presence information of this device that has been set as the address (the presence information is information as to whether the device exists and is capable of sending and receiving) is acquired in advance. If the destination is not valid, the user is alerted.

Recent MFPs have a file server function in addition to the above-mentioned transmitting function. With an MFP having the file server function, an external apparatus that exists on a network accesses a storage device within the MFP using a file protocol such as SMB or WebDAV and is capable of storing a file in the storage device of the MFP.

Further, when an MFP has the file server function, not only can a file be transmitted to it from an external apparatus present on a network but it is also possible for the MFP to transmit a file to its own storage device using a file protocol. For example, in a case where the file server function is active, the MFP transmits a file upon designating a path such as "¥¥localhost¥share" as the address. In this way the file is transferred to a file storage area (shared folder) that the MFP provides as a file server.

Thus, an MFP utilizing both a file transmitting function and a file server function is known generally. In an MFP capable of making joint use of these functions, whether the file server function is active or inactive can be set. This means that the MFP can be switched between utilization simply as a transmitting apparatus that transmits files and utilization not only as a transmitting apparatus but also as a file server.

There are cases where the user changes the setting information concerning the file server function used when accessing a file utilizing the file server function. Examples are a case where the user switches the file server function between the active and inactive states and a case where the user changes the file protocol (changes SMB to WebDAV, for example). A further example is a case where the user changes authentication information (user name or password) necessary to transfer a file utilizing the file server function.

Conventionally, in an MFP having a file server function and a file transmitting function, the above-mentioned change in the setting information relating to the file server function is not accompanied by a change in the address book.

Consequently, the conventional MFP is such that if the file server function has been switched from active to inactive, the address book will not reflect this changeover. This means that regardless of the fact that the file server function has been disabled, an address for which the file server is the destination will remain registered in the address book.

Further, the conventional MFP is such that after the file server function has been switched from inactive to active, the user must manually input and register in the address book every item of address information (file protocol and authentication information) for which the file server is the destination.

Further, there are instances where the file protocol is changed (for example, SMB is changed to WebDAV) or where the authentication information (user name or password) is changed with the file server function in the active state. In such cases the address book in which transmission addresses of files have been registered utilizing the file server function is not rewritten to accompany the change in the setting of the file server. As a consequence, even if an attempt is made to transmit a file by referring to an address registered in the address book, the file cannot be transmitted.

Thus, if the setting information relating to the file server function has been changed, the address book will not reflect the changed setting information. When the user refers to and utilizes the address book, therefore, the user experiences poor usability.

According to Japanese Patent Laid-Open No. 2008-252505, the above-mentioned presence information is acquired and verified at the time of file transfer following a change in the setting information concerning the file server function. If a defect in the address of the file server function is sensed, the processing for file transfer is halted. However, Japanese Patent Laid-Open No. 2008-252505 is such that if a defect occurs in an address of the file server function, the user may not necessarily be in the vicinity of the MFP and, even if the user is in the vicinity, the user cannot necessarily revise the address immediately. Hence a situation may arise in which file transfer cannot be executed.

SUMMARY OF THE INVENTION

An aspect of the present invention is to eliminate the above-mentioned problems in the conventional technology.

A feature of the present invention is to provide a more user-friendly address book in a communication apparatus having a file server function and a file transmitting function.

According to an aspect of the present invention, there is provided a communication apparatus having a server function for making a storage device, which stores files, accessible over a network, comprising: a setting unit configured to set the server function; a registration unit configured to register an address, which is for transmitting a file to the storage device, in an address book; a transfer unit configured to transfer a file to the storage device in accordance with the address that has been registered in the address book; and a changing unit configured to change the address, which has been registered in the address book, in accordance with a change in the setting made by the setting unit.

According to an aspect of the present invention, there is provided a control method for controlling a communication apparatus having a server function for making a storage device, which stores files, accessible over a network, the method comprising: setting the server function; registering an address, which is for transmitting a file to the storage device, in an address book; transferring a file to the storage device in accordance with the address that has been registered in the address book; and changing the address, which has been registered in the address book, in accordance with a change in the setting made in the setting step.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a diagram illustrating an example of a file server setting screen displayed on the MFP;

FIG. 5 is a diagram illustrating an example of a screen for setting a file transfer destination in the MFP;

FIG. 6 is a diagram illustrating an example of a screen for setting a file transfer destination in the MFP;

FIG. 7 is a diagram illustrating an example of a screen, which displays the details of address information, displayed when an "ADVANCED" button of "FILE SERVER OF THIS DEVICE" in FIG. 5 has been operated;

FIG. 10 is a diagram illustrating an example of a display screen displayed when a change of a file server setting is specified after an "INHIBIT" button in FIG. 8 has been operated;

DESCRIPTION OF THE EMBODIMENTS

Embodiments of the present invention are described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

It should be noted that although the embodiments are described taking an MFP (a multifunctional processing apparatus) as an example of a communication apparatus according to the present invention, the communication apparatus of the present invention is not limited to this MFP but also includes an information processing apparatus such as a personal computer, a facsimile apparatus and an information terminal, by way of example.

Figure 1:
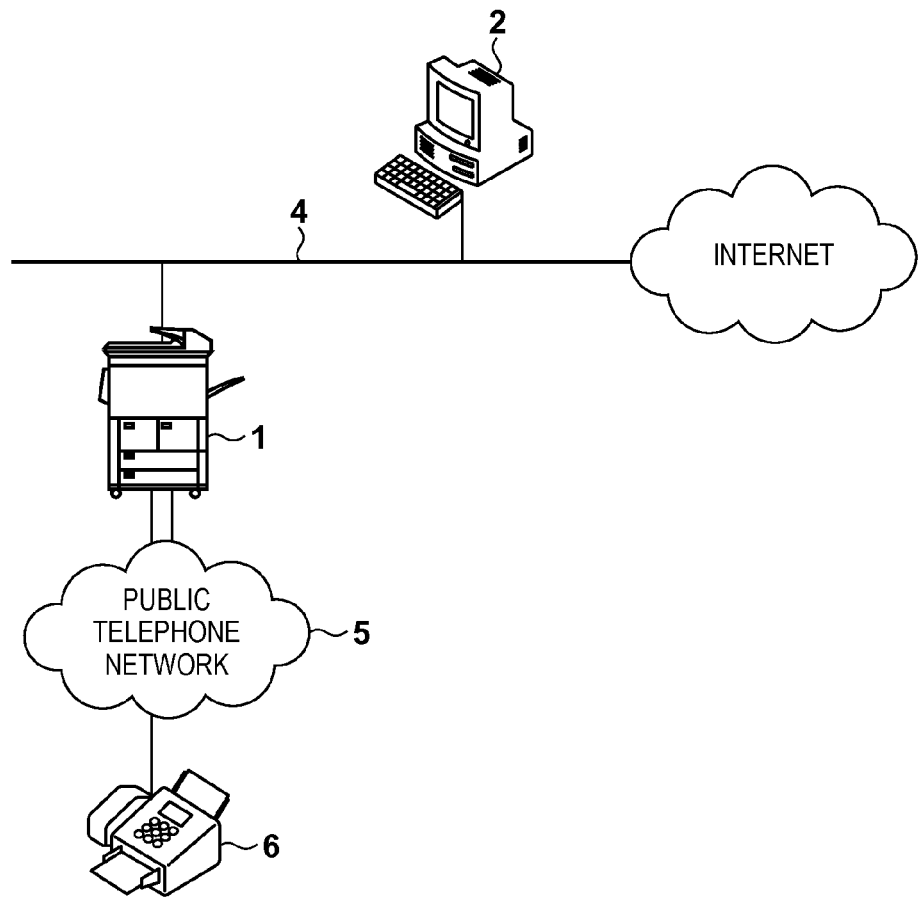
FIG. 1 is a diagram illustrating an example of a system configuration that includes an MFP and a user terminal device.

FIG. 1 is a diagram illustrating an example of a system configuration according to an embodiment of the present invention.

The system has a terminal device 2 such as a personal computer and an MFP 1 connected to a network 4 such as a LAN, and a facsimile machine 6 connected to the MFP 1 via a public telephone network 5. The network 4 is connected to the Internet and the MFP 1 is capable of communicating with various external devices via the Internet.

Figure 2:
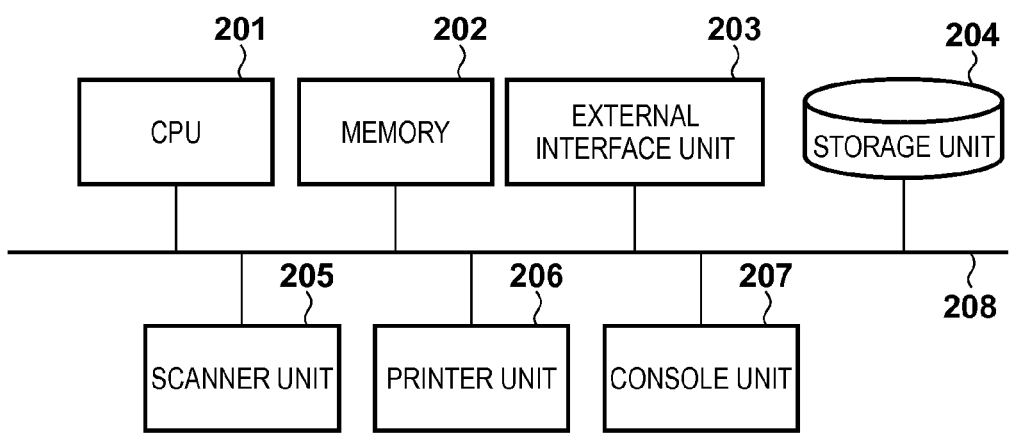
FIG. 2 is a block diagram for describing the main components of an MFP according to an embodiment.

FIG. 2 is a block diagram for describing the main components of the MFP 1 according to this embodiment of the present invention.

The MFP 1 is an image forming apparatus having various functions such as functions for scanning, printing, copying, sending and receiving, as well as a box function. The MFP 1 has a CPU 201, a memory 202, an external interface unit 203, a storage unit 204, a scanner unit 205, a printer unit 206 and a console unit 207. These units are interconnected via a bus 208. In addition, these units 203 to 207 are controlled by an MFP controller 300 (see FIG. 3) including the CPU 201 and the memory 202, described later.

The CPU 201 controls the operation of the MFP 1 in accordance with a program that has been stored in the memory 202. The memory 202 has a ROM and a RAM and stores programs executed by the CPU 201, various data that has been received and image data obtained by being read in by the scanner unit 205. The external interface unit 203 communicates with other external devices via the network 4 and public telephone network 5. The storage unit 204 stores various settings information, an address book and image files. An example of the storage unit 204 is a hard-disk drive (HDD). The scanner unit 205 reads a document and generates image data representing the image of the document. The printer unit 206 has a print engine of the electrophotographic or inkjet type and prints in accordance with print data sent to it under the control of the CPU 201. The console unit 207 includes a display unit, which has a touch panel, and a key operation unit, and is used to input various data and to display messages or the like for the user to observe.

In a case where an operating system and various control programs have been installed in the storage unit 204, a boot program that has been stored in the ROM of the memory 202 is launched by turning on the power supply of the MFP 1, and the operating system and control programs stored in the storage unit 204 are loaded in the memory 202. As a result, the operating system and control programs in the memory 202 are executed under the control of the CPU 201. The MFP 1 operates accordingly.

Figure 3:
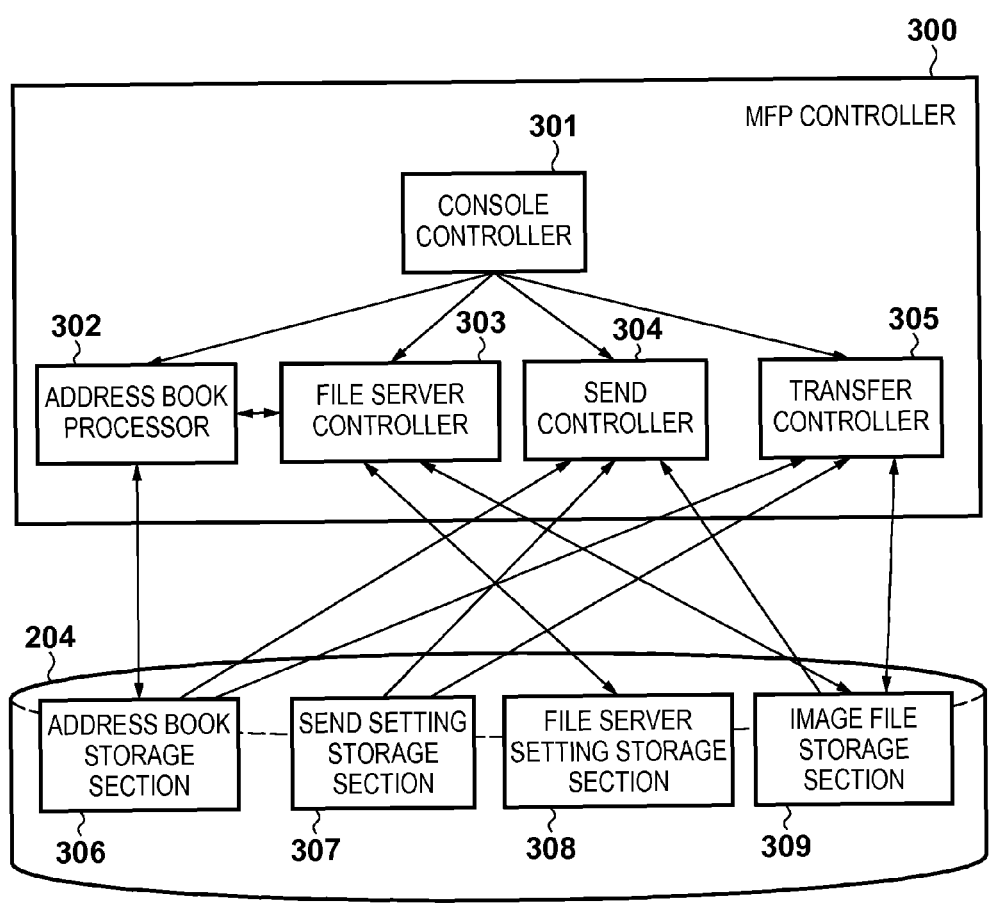
FIG. 3 is a block diagram for describing the functional configuration of an MFP controller of the MFP according to a first embodiment of the present invention.

FIG. 3 is a block diagram for describing the functional configuration of the MFP controller 300 of the MFP 1 according to a first embodiment.

A console controller 301 controls the MFP 1 based upon information that has been input by the user using the console unit 207. An address book processor 302 updates the information in the address book in accordance with the input information from the console controller 301. A file server controller 303 makes it possible to access the area of the storage unit 204, or to deny access, from an external device via the network 4 in accordance with input information from the console controller 301. A send controller 304 sends an image file, which has been stored in the storage unit 204, to an external device via the external interface unit 203 in accordance with the input information from the console controller 301. When transfer of a file is set by the input information from the console controller 301, a transfer controller 305 transfers a file, which has been received from an external device via the external interface unit 203, to the designated transfer destination if a predetermined condition has been satisfied. An example of the predetermined condition is that a document file obtained by facsimile reception is transferred to a specific file server. The units 301 to 305 described above are implemented as a result of the CPU 201 executing a program stored in the memory 202.

Contents stored in the storage unit 204 will be described next.

An address book storage section 306 holds multiple items of address information (inclusive of addresses and various information described later) created by the address book processor 302. A send setting storage section 307 stores send setting information that has been set by the transfer controller 305. A file server setting storage section 308 stores whether a file will be opened to the public or not and, if the file is to be opened to the public, the protocol thereof and user authentication information, etc. An image file storage section 309 stores an image file received by the file server controller 303 or the transfer controller 305. It should be noted that in this embodiment, it is assumed that a document file containing document data also is handled as an image file.

FIG. 4 is a diagram illustrating an example of a file server setting screen displayed on the MFP 1 according to this embodiment. The screen is displayed on the display unit of the console unit 207.

A disclosure setting input field 401 is used for setting ON (a setting to open the file server to the public) or OFF (a setting to not open the file server to the public). The disclosure setting input field 401 has a pull-down menu that includes "ON" and "OFF", and "ON" or "OFF" can be set in accordance with an instruction from the user. The file server controller 303 arranges it so that in case of the "ON" setting, the MFP 1 can be utilized as a file server that allows an external device (or the MFP 1) to access image files that have been stored in the image file storage section 309. Further, the file server controller 303 arranges it so that in case of the "OFF" setting, an external device is not allowed to access the image files that have been stored in the image file storage section 309. The "ON" setting has been made in FIG. 4.

A file protocol input field 402 is used to designate a protocol for opening the file server to the public by the file server controller 303. Examples of types of protocols are SMB (Server Message Block), WebDAV (Web-based Distributed Authoring and Versioning) and FTP (File Transfer Protocol). In FIG. 4, "SMB" has been designated.

A user name input field 403 is used to designate the user name of a user capable of accessing the file server. A password input field 404 is used to input a password corresponding to the user name entered in the user name input field 403. By thus setting user information that includes user name and the corresponding password, authentication of the user of an external device can be performed in a case where the external device accesses the MFP 1 functioning as a file server. Only a user (external device) for whom authentication has succeeded can access image files that have been stored in the image file storage section 309. The input fields 402 to 404 are enabled only in a case where the disclosure setting input field 401 has been set to "ON" (to open the file server to the public).

FIG. 5 is a diagram illustrating an example of a screen for setting a file transfer destination in the MFP 1. This screen is a screen for displaying an address list (address book) in a case where the disclosure setting input field 401 of FIG. 4 has been set to "ON".

An address list 501 displays a list of addresses that have been registered in an address book. If one or a plurality of addresses are selected from the list of addresses displayed on the screen of FIG. 5 and a "SELECT" button 504 is pressed, a file can be transferred/transmitted to the destination indicated by the selected address. In the example of FIG. 5, the address of the file server possessed by the MFP 1 has been registered in the address book automatically as "FILE SERVER OF THIS DEVICE" 502 since the disclosure setting has been set to "ON".

FIG. 6 is a diagram illustrating an example of a screen for setting a file transfer destination in the MFP 1. This screen displays an address list in a case where the disclosure setting input field 401 has been set to "OFF".

An address list 601 displays a list of addresses that have been registered in the address book. Since the disclosure setting is "OFF", "FILE SERVER OF THIS DEVICE" 502 in FIG. 5, namely the address of the file server of MFP 1, has been deleted.

FIG. 7 is a diagram illustrating an example of a screen, which displays the details of address information, displayed when an "ADVANCED" button 503 of "FILE SERVER OF THIS DEVICE" in FIG. 5 has been operated.

Here protocol, host name, folder path, user name and password are registered automatically. Host name and folder path are registered appropriately in accordance with the protocol. In FIG. 7, the host name has been set to "¥¥localhost" and the folder path to "¥share". The reason for this is that the protocol that has been set on the file server setting screen of FIG. 4 is "SMB".

It should be noted that the user name and password are the same as those set in FIG. 4 and are used for authentication when a user accesses the file server.

Figure 8:
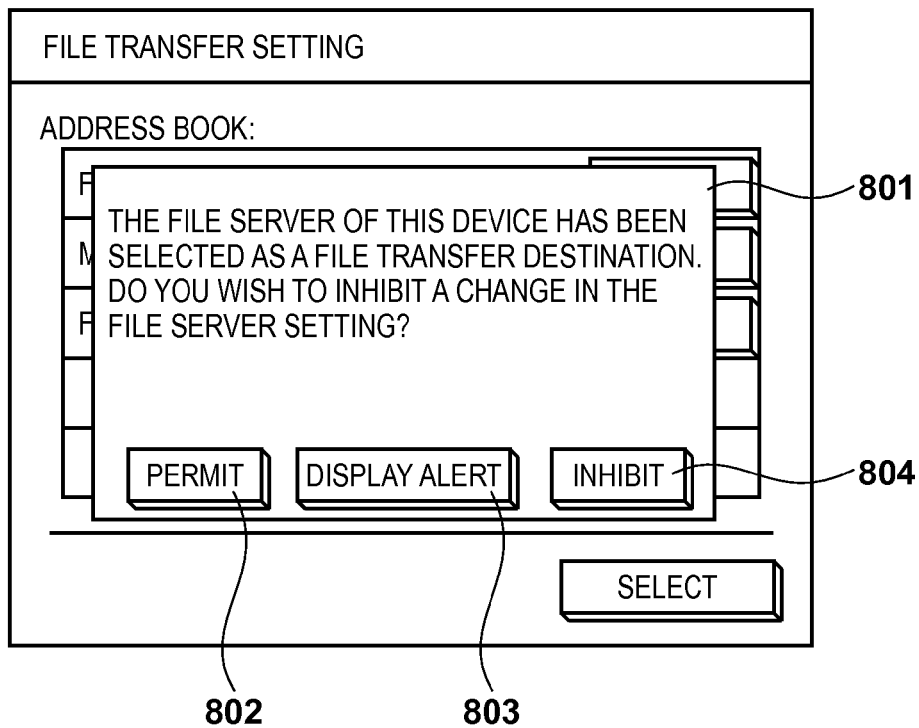
FIG. 8 is a diagram illustrating an example of a display screen for setting whether or not to allow change of a file server setting when "FILE SERVER OF THIS DEVICE" has been selected and a "SELECT" button operated in FIG. 5.

FIG. 8 is a diagram illustrating an example of a screen, which is for setting whether or not to allow change of a file server setting, displayed when "FILE SERVER OF THIS DEVICE" 502 has been selected as the file transfer destination and the "SELECT" button 504 operated in FIG. 5.

Since a file server has been selected as the file transfer destination, a confirmation display area 801 is an area for confirming whether a change in this setting is permitted or not. If a "PERMIT" button 802 is operated, it becomes possible to unconditionally change the disclosure setting on the file server setting screen shown in FIG. 4. If a "DISPLAY ALERT" button 803 is operated, a screen for alerting the user is displayed when the disclosure setting on the file server setting screen is changed. If an "INHIBIT" button 804 is operated, a change in the disclosure setting on the file server setting screen is inhibited even if an attempt to change the setting is made.

Figure 9:
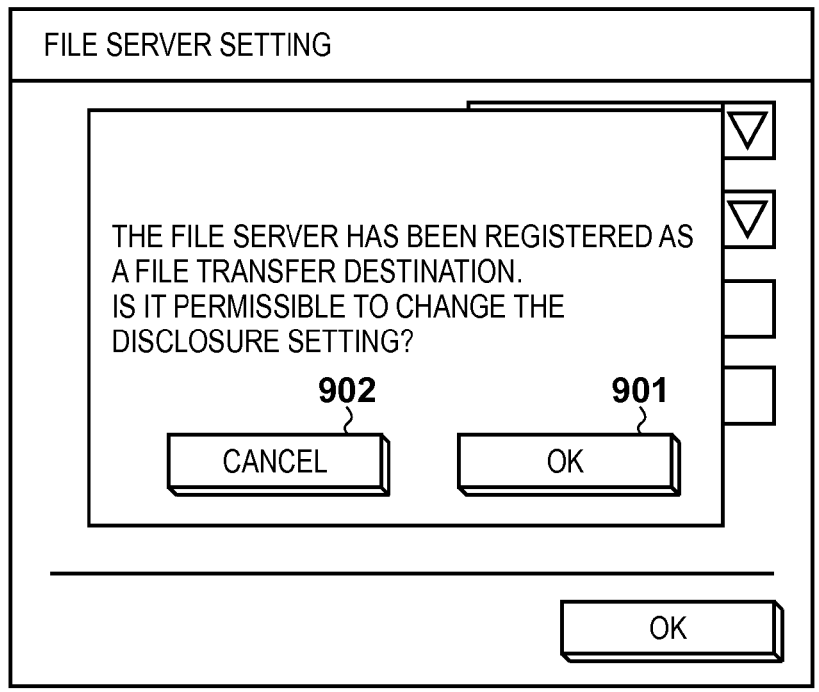
FIG. 9 is a diagram illustrating an example of a display screen displayed when a change of address information of a file server is specified after a "DISPLAY ALERT" button in FIG. 8 has been operated.

FIG. 9 is a diagram illustrating an example of a display screen displayed when a change of address information of the file server is specified on the screen of FIG. 7 after the "DISPLAY ALERT" button 803 in FIG. 8 has been operated.

More specifically, after the "DISPLAY ALERT" button 803 of FIG. 8 has been operated and the address information of "FILE SERVER OF THIS DEVICE" has been set on the screen of FIG. 7, the screen of FIG. 9 is displayed when the disclosure setting, for example, is changed and the "OK" button 405 is operated on the screen shown in FIG. 4. This screen queries the user as to whether it is permissible to change the disclosure setting of this file server, which has been registered as a file transfer destination. If an "OK" button 901 is operated as the response, it becomes possible to change the disclosure setting of the file server. On the other hand, if a "CANCEL" button 902 is operated as the response, then the disclosure setting of the file server will not be changed.

FIG. 10 is a diagram illustrating an example of a display screen displayed when a change of a file server setting is specified after the "INHIBIT" button 804 in FIG. 8 has been operated.

More specifically, after the "INHIBIT" button 804 has been designated in FIG. 8 and the address information of "FILE SERVER OF THIS DEVICE" has been operated set on the screen of FIG. 7, the screen of FIG. 10 is displayed when the disclosure setting, for example, is changed and the "OK" button 405 is operated on the screen shown in FIG. 4. This screen displays the fact that the disclosure setting of the file server cannot be changed. If an "OK" button 1001 in FIG. 10 is operated, the display returns to that of FIG. 4 and the disclosure setting remains "ON".

Figure 11:
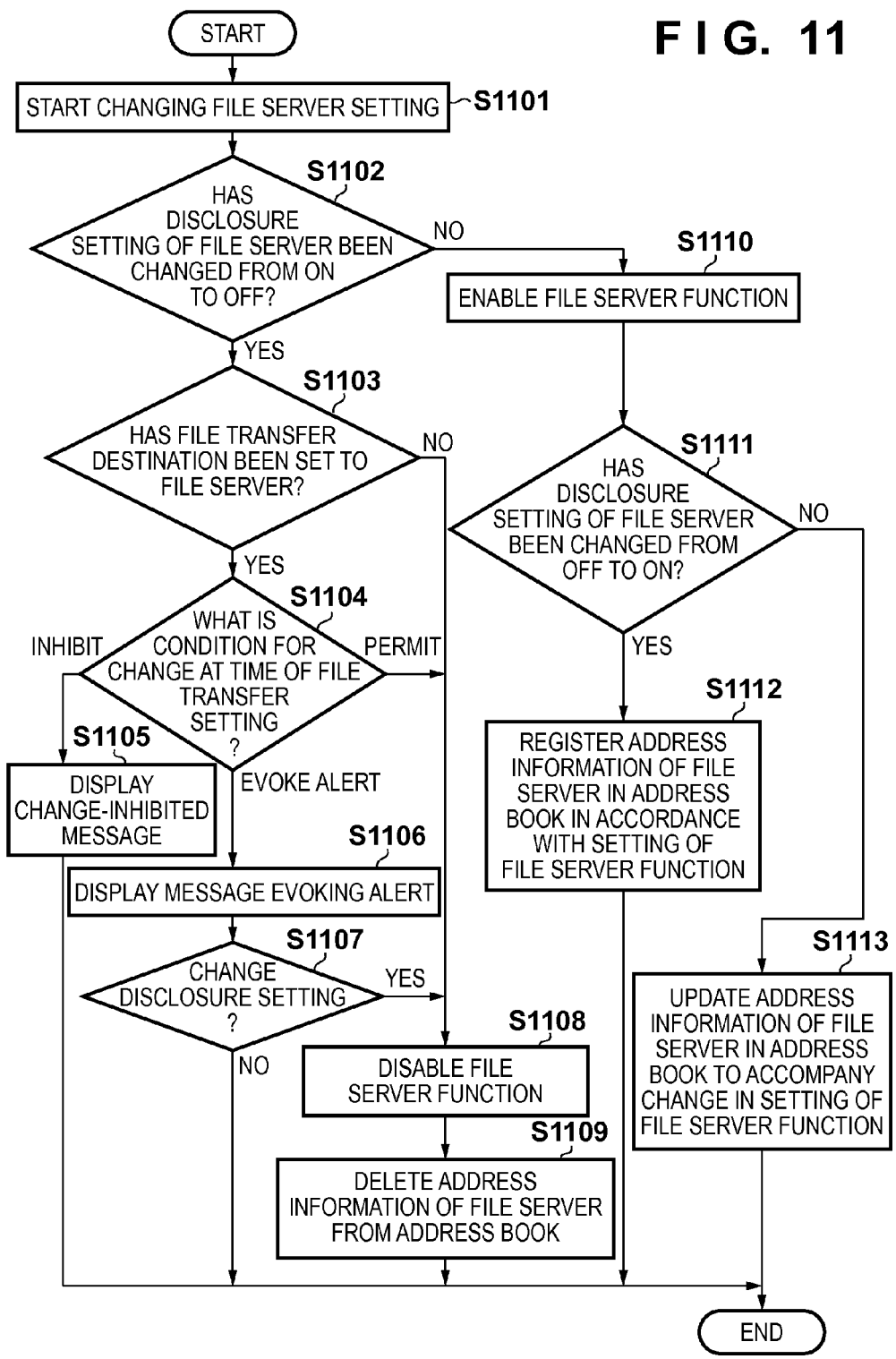
FIG. 11 is a flowchart for describing processing executed by the MFP when a file server of the MFP according to the first embodiment is set as a file transfer destination.

FIG. 11 is a flowchart for describing processing executed in the MFP 1 of this embodiment for updating address information, which has been registered in the address book, in operative association with the setting of the file server. It should be noted that the program for executing this processing is stored in the memory 202 at the time of program execution and is run under the control of the CPU 201. In the description that follows, operation will be described while referring to the components of the MFP controller 300 shown in FIG. 3. Specifically, the processing of this flowchart is started by pressing the "OK" button 405 on the file server setting screen of FIG. 4.

The processing indicated by this flowchart is premised on the fact that the disclosure setting is changed from "OFF" to "ON" or from "ON" to "OFF" or is left at "ON". First, in step S1101, the file server controller 303 starts changing the file server setting based upon change information concerning the file server address information received from the console controller 301 using the screen shown in FIG. 4. Control then proceeds to step S1102. In step S1102, the file server controller 303 determines whether the disclosure setting of the file server has been changed from "ON" to "OFF". Control proceeds to step S1103 if the disclosure setting has been changed from "ON" to "OFF". Otherwise, control proceeds to step S1110. In step S1103, the file server controller 303 determines whether the address of the file server of MFP 1 has been set as a file transfer destination. If the file server has been set as a transfer destination, control proceeds to step S1104. Otherwise, control proceeds to step S1108.

In step S1104, the file server controller 303 determines the condition for changing the file server setting, the condition having been set by the user on the screen for setting file transfer shown in FIG. 8. Control proceeds to step S1105 when the "INHIBIT" button 804 has been selected, to step S1106 when the "DISPLAY ALERT" button 803 has been selected, and to step S1108 when the "PERMIT" button 802 has been selected.

Step S1105 is for a case where a change in the file server setting is inhibited. The file server controller 303 sends the console controller 301 a message to the effect that a change is inhibited, displays a screen (FIG. 10), which includes this message, on the display unit of the console unit 207 and then terminates processing. In step S1106, which is for issuing an alert, the file server controller 303 sends the console controller 301 an alert message and displays a screen (FIG. 9), which includes this message, on the display unit of the console unit 207. Control then proceeds to step S1107. In step S1107, the system waits for the user to select on the screen of FIG. 9 whether or not the disclosure setting is to be changed. If the "OK" button 901 is selected to specify a change in the disclosure setting, control proceeds to step S1108. On the other hand, if the "CANCEL" button 902 is selected to specify that a change in disclosure setting will not be made, then processing is exited.

If the disclosure setting is changed over from "ON" to "OFF", then the file server controller 303 disables the file server function in step S1108. Control then proceeds to step S1109. In a case where the file server function has been changed over from the active to the inactive state, the file server function is disabled. In such case, even though address information and the like including the path "¥¥localhost¥share" in accordance with SMB has been registered in the address book, file transfer using this path can no longer be performed. In step S1109, therefore, the file server controller 303 sends the address book processor 302 a message indicative of deletion of the address information of this file server. In response, the address book processor 302 deletes the address information of the file server, which has been registered as "FILE SERVER OF THIS DEVICE", from the address book storage section 306 and then terminates processing. As a result, the user can no longer select the filer server of the MFP 1 as a file transfer destination by using the address book. That is, as a result of the disclosure setting being changed from "ON" to "OFF", the address of the file server that has become unusable is no longer displayed. This means that a situation in which the user selects an unusable address by referring to the address book can be prevented.

When the disclosure setting of the file server has not been changed from "ON" to "OFF" in step S1102, control proceeds to step S1110. Here the file server controller 303 enables the filer server function in accordance with input parameters received from the console controller 301, after which control proceeds to step S1111. Here the file server controller 303 determines whether the disclosure setting of the file server has been changed from "OFF" to "ON". If such is the case, control proceeds to step S1112 and the file server controller 303 sends the address book processor 302 the address information conforming to the file server disclosure setting. Upon receiving this address information, the address book processor 302 registers this address in the address book based upon the address information and then terminates processing. That is, the address information of "FILE SERVER OF THIS DEVICE" is registered in the address book automatically in response to the fact that the disclosure setting of the file server has been changed from inactive (OFF) to active (ON). According to step S1112, the address information of the file server of MFP 1 (namely of the "FILE SERVER OF THIS DEVICE") is registered in the address book automatically merely as a result of the user changing the disclosure setting of the file server from "OFF" to "ON". This means that it is no longer necessary for the user to input to the address book the path ("¥localhost¥share" or the like in case of SMB) in accordance with the file protocol and the authentication information (user name and password). This makes it possible to enhance usability significantly.

If it is determined in step S1111 that the disclosure setting of the file server has not been changed from "OFF" to "ON", on the other hand, it is determined that the file protocol input field 402 has been changed (that SMB has been changed to WebDAV, for example) or that user name input field 403 or password input field 404 has been changed (that the user name or password has been changed, for example). Control proceeds to step S1113. Here the file server controller 303 sends the address book processor 302 the address information conforming to the file server disclosure setting after the change. As a result, based upon this address information, the address book processor 302 automatically updates the address information of the file server registered in the address book. Step S1113 corresponds to a change other than that of "DISCLOSURE SETTING", namely a case where protocol, user name or password, etc., has been changed on the screen of FIG. 4, by way of example. When the user changes the content of the disclosure setting via the file server setting screen in step S1113, this change is accompanied by automatic updating of the file server address information that has been registered in the address book. According to this embodiment, the address information of "FILE SERVER OF THIS DEVICE" (MFP 1) is updated in the example of FIG. 5 or 6.

Figure 12:
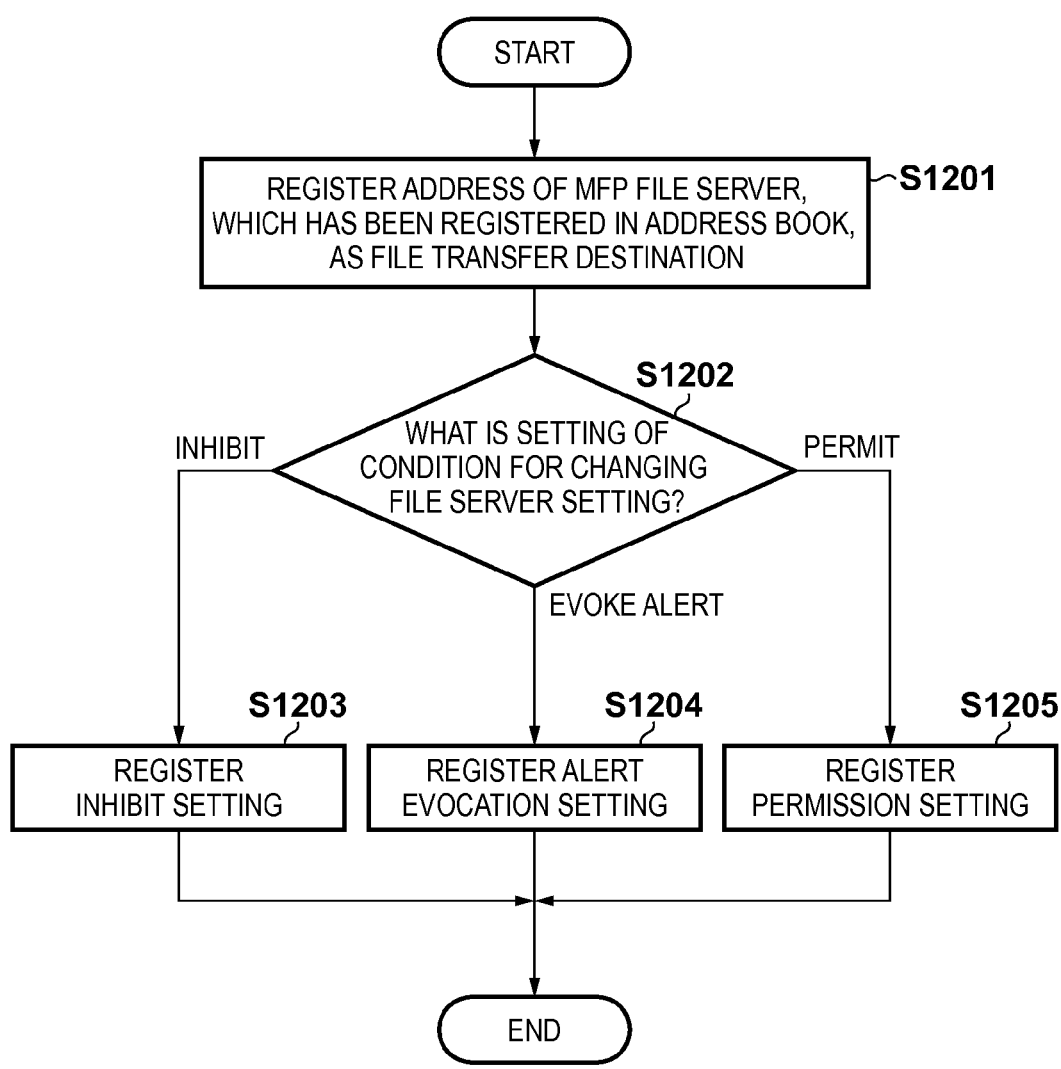
FIG. 12 is a flowchart for describing processing (which corresponds to the processing at step S1101 in FIG. 11) for changing a file server setting by the MFP according to the first embodiment.

FIG. 12 is a flowchart for describing processing executed in the MFP 1 of the first embodiment when "FILE SERVER OF THIS DEVICE" has been selected on the screen shown in FIG. 5. The program for executing this processing is stored in the memory 202 and is executed under the control of the CPU 201.

First, in step S1201, when there is an input from the console controller 301 setting the file server of MFP 1 as the transfer destination, the transfer controller 305 sets the address of the file server of MFP 1 as the transfer destination in the send setting storage section 307. Control then proceeds to step S1202. Here the transfer controller 305, which has received from the console controller 301 a change in the setting of the file server that has been input by the user, discriminates the processing that corresponds to the setting change made on the screen of FIG. 8. If the "INHIBIT" button 804 has been selected, control proceeds to step S1203 and the transfer controller 305 stores the selection information, which is for inhibiting the change in the file server setting, in the file server setting storage section 308. On the other hand, if the "DISPLAY ALERT" button 803 has been selected, control proceeds to step S1204. Here the transfer controller 305 stores the selection information, which stipulates that the user is to be alerted of the setting change when a change in the file server setting has been specified, in the file server setting storage section 308. If the "PERMIT" button 802 has been selected, control proceeds to step S1205. Here the transfer controller 305 stores the selection information, which is information to the effect that the change in file server setting is permitted, in the file server setting storage section 308.

In accordance with the first embodiment, as described above, when the file server of the MFP 1 is set as a file transfer destination, the address information of the file server of the MFP 1 can be selected automatically and registered. As a result, it is no longer necessary to manually update the address information of the file server that has been registered in the address book.

Further, when setting information that sets the MFP file server as the transfer destination is changed, the address information of the MFP file server that has been registered in the address book is changed automatically based upon this setting information. As a result, updating of the address information by the user is unnecessary and user error in updating the address information of the address book can be prevented.

Further, in a case where the MFP file server has been set as a file transfer destination, it becomes possible to inhibit the user from changing the setting of the MFP file server or to alert the user when a change is made. As a result, it is possible to prevent the user from making an unintended change in the file server setting.

Second Embodiment

A second embodiment of the present invention will be described next. It should be noted that the configuration of the system and the structure of the MFP 1 (FIGS. 1 and 2) according to the second embodiment are the same as those of the first embodiment and need not be described again.

Figure 13:
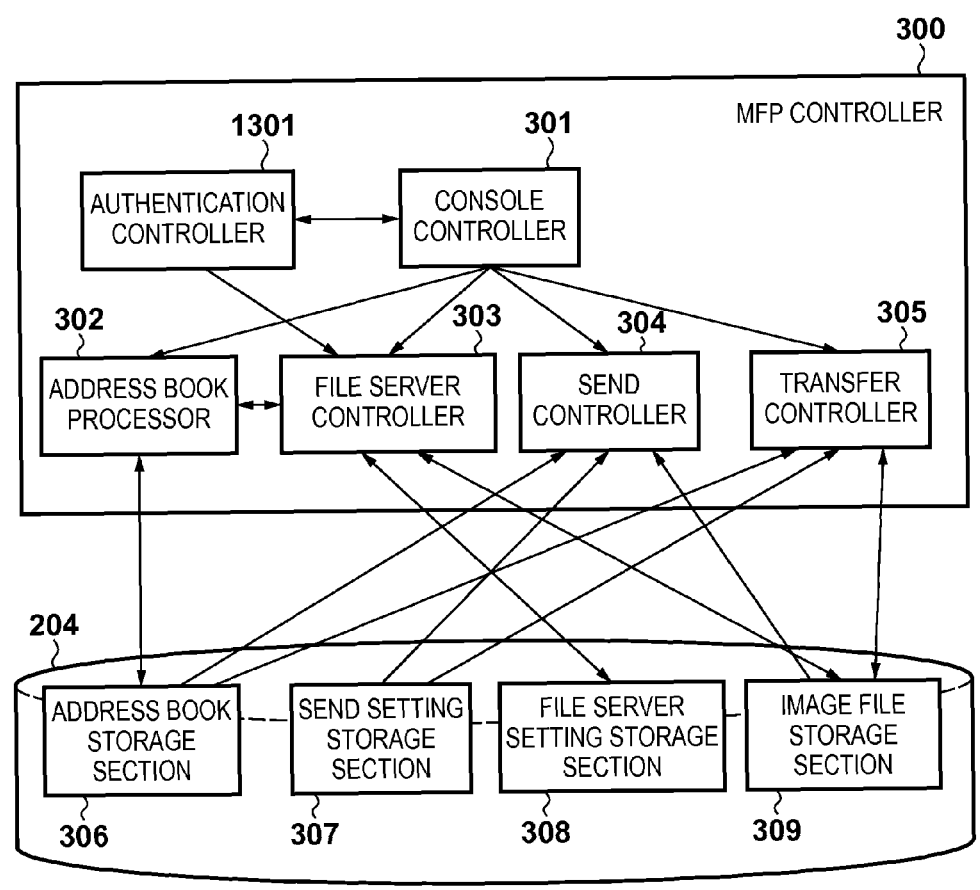
FIG. 13 is a block diagram for describing the functional configuration of an MFP control unit of an MFP according to a second embodiment of the present invention.

FIG. 13 is a block diagram for describing the functional configuration of the MFP controller 300 of MFP 1 according to the second embodiment. FIG. 13 differs from FIG. 3 in that it is additionally provided with an authentication controller 1301.

The authentication controller 1301 prompts the user for input of authentication information when the user utilizes the MFP 1. A user name and password that have been input by the user via the console unit 207 are received and the authentication information is transmitted to the authentication controller 1301 via the console controller 301. In response, the authentication controller 1301 determines whether the authentication information received from the console controller 301 matches authentication information in an authentication list held in the authentication controller 1301. If the items of authentication information match, the authentication controller 1301 permits the user to utilize the MFP 1. It should be noted that once authentication succeeds, the authenticated state remains in effect until a period of time over which there is no user input to the console unit 207 reaches a certain value. Once the user has been authenticated, the MFP 1 may perform various control operations utilizing the information concerning the user for whom authentication has succeeded.

With the user authenticated, the address book processor 302 processes only the address information that the authenticated user has registered in the address book. Further, when the file server disclosure setting is made with the user in the authenticated state, the file server controller 303 provides the file server function capable of being utilized with the user name and password of the authenticated user. In addition, a name that is based upon the user name is assigned to the path that is for the purpose of accessing this file server function. When the authenticated user sets the transfer destination utilizing the address book, the transfer controller 305 uses only the address information that has been registered by the user and the address information of the file server of the MFP 1 set by the user.

According to the second embodiment, it can be arranged so that when an authenticated user sets the file server as the transfer destination, the path for accessing the file server function will differ depending upon the authenticated user and, furthermore, the list of addresses displayed when the address book is used will differ depending upon the authenticated user. As a result, the content of a file server setting made by an authenticated user differs from the content of a file server setting made by a user who has not been authenticated. This reduces the possibility of an erroneous operation by the user and leads to enhanced convenience.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-026528, filed Feb. 9, 2011, which is hereby incorporated by reference herein in its entirety.

What is claimed is:

1. A communication apparatus, comprising:
    a storage unit configured to store data;
    a processor; and
    a memory coupled to the processor, wherein the memory includes instructions executable by the processor to:
    register addresses including at least a first address of the storage unit and a second address of an external device;
    display, by a display unit, the registered addresses in a selectable form;
    select an address from the displayed addresses;
    transfer data, which has been received from a facsimile device, to the storage unit or the external device connected to the communication apparatus over a network, wherein the data is transferred to the selected address;
    set a server function to be enabled or disabled, the server function allowing a client to access the storage unit over the network; and
    determine, upon the server function being set to be disabled, the first address of the storage unit and then control the display unit to display the registered addresses except the first address.

2. The apparatus according to claim 1, wherein registering the addresses comprises registering a transfer protocol, a host name, a folder path, a user name and a password in accordance with each registered address.

3. The apparatus according to claim 1, wherein registering the addresses comprises registering automatically, upon the server function being set to be enabled, the first address.

4. The apparatus according to claim 1, wherein each address corresponds to an SMB (Server Message Block) protocol or a WebDAV (Web-based Distributed Authoring and Versioning) protocol.

5. A non-transitory computer-readable storage medium storing a program for causing a computer to function as the communication apparatus set forth in claim 1.

6. The apparatus according to claim 1, wherein the first address is a loopback address.

7. The apparatus according to claim 1, wherein the controlling comprises, upon the server function being set to be disabled deleting the first address from the registered addresses.

8. A control method for controlling a communication apparatus, the method comprising:
    storing data in a storage unit;
    registering addresses including at least a first address of the storage unit and a second address of an external device;
    displaying, by a display unit, the registered addresses in a selectable form;
    selecting an address from the displayed addresses;
    transferring data, which has been received from a facsimile device, to the storage unit or the external device connected to the communication apparatus over a network, wherein the data is transferred to the selected address;
    setting a server function to be enabled or disabled, the server function allowing a client to access the storage unit over the network; and
    determining, upon the server function being set to be disabled, the first address of the storage unit and then controlling the display unit to display the registered addresses except the first address.

* * * * *